R. I. BURBANK.
Straw Cutter.
No. 85,067.  Patented Dec. 22, 1868.
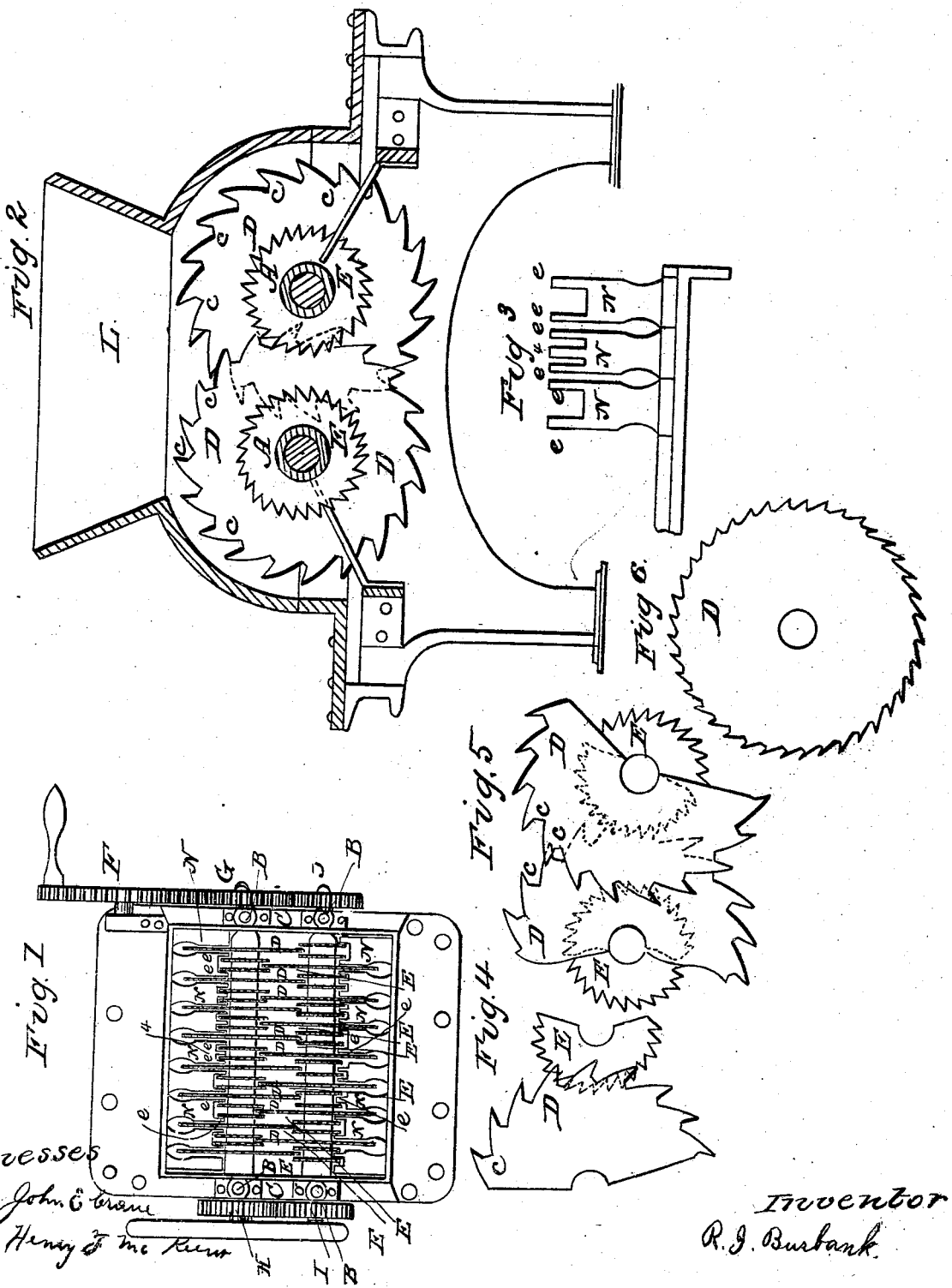
Inventor
R. I. Burbank.

ROBERT I. BURBANK, OF BOSTON, MASSACHUSETTS.

Letters Patent No. 85,067, dated December 22, 1868.

IMPROVEMENT IN MACHINE FOR CUTTING HAY, STRAW, AND VEGETABLES.

The Schedule referred to in these Letters Patent and making part of the same.

*To all whom it may concern:*

Be it known that I, ROBERT I. BURBANK, of Boston, in the county of Suffolk, and State of Massachusetts, have invented certain new and useful Improvements in Machines for Breaking and Cutting Hay and Straw and for Cutting Vegetables to be fed to animals, of which the following is a full, clear, and exact description, reference being had to the accompanying drawings, making a part of this specification, in which—

Figure 1 represents a top view after the hopper and the top covering have been removed, or that portion above the line $x$, seen in Figure 2, which represents a vertical longitudinal section on the line A B of fig. 1.

Figure 3 represents a section of the notched and forked clearers detached, with a portion of the girt which supports them in the frame.

Figures 4 and 5 represent fragments of the different saws employed, and their sectional elevation in each series—portions of some, with portions of others beyond them.

Figure 6 represents a side elevation of one of my improved ĸ-tooth saws, of about the right degree of fineness, that is, having about the suitable number of teeth to operate successfully, in connection with the smaller saws on the opposite shaft, when applied, as shown in figs. 1 and 2.

This invention relates to a new and improved machine for breaking and cutting feed for animals; and It consists in a novel construction and arrangement of the essential parts, whereby hay or straw may be broken, split, opened, and softened, as well as cut or severed; or vegetables may be cut or sliced rapidly, and in pieces of uniform size, and either substance prepared for feed in a superior manner.

In constructing my improved machine, two transverse shafts, A, are arranged to rotate in bearings, B, rising from the top of the frame C, and on each of these two shafts a double series of circular saws, D and E, are arranged, as shown in the drawings, and more clearly shown in fig. 1.

The particular novelty of the large saws D consists in what I call ĸ-teeth, the front side of each tooth resembling somewhat the two angular lines of the letter ĸ.

These ĸ-teeth point inward towards each other, and the shafts are geared together at one or both ends with equal gears, G H I J which cause them to rotate each in an opposite direction, and both at the same velocity, being driven by a gear, F, which gears into the gear G, on one end of one of the shafts A.

These ĸ-tooth saws arranged on the shafts are firmly clamped between collars, in the usual way, to prevent the shaft turning within the saws when in operation.

Between all the larger ĸ-tooth saws, on both of the shafts, smaller saws, E, are arranged, as shown, (two smaller saws between each of the two larger ones,) and the teeth of each of all the larger saws in each series run between the teeth of two of the smaller saws arranged on the opposite shaft. The teeth of the larger saws point and operate inward and downward, while the teeth of the smaller saws point upward and outward.

For cutting carrots or other vegetables, the teeth of the large saws may be coarse, as shown in fig. 2; but for operating on hay or straw, the teeth of the larger saws should be finer, as shown in fig. 6, and considerably outnumber the teeth of the smaller saws, for, as will be clearly seen, where both shafts rotate at the same velocity, the toothed-edge periphery or circumferencial surface of each larger saw moves more rapidly than the toothed edges of the smaller ones, and by having a larger number of teeth in the larger than in the smaller saws, (such teeth pointing and operating in opposite directions,) there will be a cutting-action between the teeth of the smaller saws and the more rapidly-moving ĸ-teeth, or toothed edge, of the larger ones running between two of the smaller, and this cutting-action of the saw-teeth, produced as above described, divides or severs the stalks, and other portions of the hay or straw, in a suitable manner.

No very great amount of cutting is designed to be performed by the point-portions of the ĸ-teeth of the larger saws, operating in connection with each other, but the neck-portions or throats $c$, of the ĸ-teeth, are intended to break, split, and soften the substance of straw or hay, and at the same time to cut, sever, or divide such substances, when brought downward into contact with the teeth of the smaller saws, the first operation being performed by the ĸ-teeth of the larger saws, and the second, or final operation, by the ĸ-teeth of the larger operating in connection with the teeth of the smaller saws, the latter teeth pointing upward, as shown.

The larger or ĸ-teeth saws should be arranged from one-half of an inch to one inch or more apart, on each of the shafts, and each of said saws should come about half way between two others, on the opposite shaft, so that the action of all such saws shall be uniform to break, split, and soften the stalks of hay, straw, or other similar substance; and this breaking, splitting, and softening operation renders hay or straw much better adapted, or better prepared or fitted for feed, than cutting alone, for when such substances are only cut, the stiff, short, hard fragments generally have sharp-pointed or very hard ends, which prick or injure the mouth, and greatly annoy the animal eating such hard or sharp-ended substance.

It will, therefore, be readily seen that by breaking, crushing, and splitting the stalks of hay or straw, and by opening and dividing the fragments longitudinally, the nutritious properties of such feed are more thoroughly liberated, and that such perfectly-prepared feed requires much less mastication to fit it for the stomach of the animal, which I consider of great importance, as all animals thrive much better on perfectly-prepared food than on feed which has been only partially and imperfectly prepared.

Notched clearers, N, are arranged between all the larger saws, the notches of such clearers opposite the saw-teeth, as in my former invention.

The clearers in this machine are forked as well as notched, so as to serve the double purpose of clearing the small saws as well as the larger ones.

These clearers may be made with only two forked portions, e, each to cover one side of a small saw; or there may be a central-fork portion, 4, to act between the small saws, all as seen in figs. 1 and 3.

A single series of the κ-tooth saws may be employed, and on one shaft only; and a single series of the small saws on the opposite shaft; that is, all the larger or κ-tooth saws on one shaft, and all the small saws on the other, and do good service in cutting feed, provided the teeth of the small saws point upward, as shown, and the κ-teeth of the larger saws run between two of the smaller; but I find, by employing the double series of saws, as clearly shown in the drawings, the larger saws with κ-teeth for breaking, splitting, opening, and softening the substance under operation, and the smaller saws, constructed, arranged, and operating in connection with the larger ones for dividing or severing the substance, the result is very favorable and satisfactory.

The κ-teeth in the larger saws may be more or less hooking, and longer or shorter, as seen in fig. 6, where teeth of several forms are shown.

Power is applied to turn the crank-wheel F, which gears into the gear G, on one end of one of the shafts A, and the other shaft is driven from this first-named by gears G or H gearing into gears I and J, only one of which need be used, the latter generally being dispensed with, and the gear G made smaller, to increase the speed of the same.

Hay, straw, or vegetables, placed in the hopper L, are readily seized upon by the κ-teeth of the saws D, and either fully prepared for feed as described.

I do not claim saws for cutting hay, straw, or vegetables, nor do I claim clearers between saws, such devices being old and well known; but What I do claim, and desire to secure by Letters Patent, is—

1. One or more series of κ-tooth saws D, constructed and operating in connection with another, as described, and each or either in connection with a series of small saws, E, arranged at each side of the former, on an opposite shaft, the teeth of the latter pointing upward and outward while rotating inward and downward towards the other, and all arranged to operate substantially in the manner and for the purpose specified.

2. The notched and forked clearers N, constructed as described, in combination with the saws D and E, as and for the purpose specified.

3. The combination of all the operative parts specified, when arranged to operate substantially as and for the purpose set forth

R. I. BURBANK.

Witnesses:
JOHN E. CRANE,
HENRY F. McKEEVER.